United States Patent [19]

Ignatchenko et al.

[11] Patent Number: 6,156,999
[45] Date of Patent: Dec. 5, 2000

[54] METHOD AND DEVICE FOR WELDING ARC IGNITION FOR ARC WELDING APPARATUS

[75] Inventors: Georgy Ignatchenko; Evgeny Bogachenkov; Igor Dykhno, all of Kiryat Byalik, Israel

[73] Assignee: Plasma-Laser Technologies Ltd., Haifa, Israel

[21] Appl. No.: 09/220,587

[22] Filed: Dec. 28, 1998

[51] Int. Cl.$^7$ .................................................. B23K 9/067
[52] U.S. Cl. ......................................................... 219/130.4
[58] Field of Search ........................... 219/130.4, 130.1, 219/130.21, 130.31, 130.32, 130.33, 130.5, 130.51, 137 PS

[56] References Cited

U.S. PATENT DOCUMENTS

| | | | |
|---|---|---|---|
| 2,970,207 | 1/1961 | Stohr | 219/130.4 |
| 3,241,218 | 3/1966 | Phillips | 219/130.4 |
| 3,249,735 | 5/1966 | Needham | 219/130.51 |
| 3,356,928 | 12/1967 | Parrish | 219/130.32 |
| 3,818,177 | 6/1974 | Needham et al. | |
| 4,672,175 | 6/1987 | Niven | 219/130.4 |
| 4,950,864 | 8/1990 | Campiotti et al. | 219/130.4 |
| 5,117,088 | 5/1992 | Stava | |

FOREIGN PATENT DOCUMENTS 2.016.327  5/1970  France.

*Primary Examiner*—Clifford C. Shaw
*Attorney, Agent, or Firm*—Mark M. Friedman

[57] ABSTRACT

Method and device for welding arc ignition of an arc welding apparatus providing a reduced level of high frequency disturbances. A welding electrode and a workpiece are connected with a welding power source and to at least two additional high voltage power sources. A short a periodic high voltage pulse is transmitted from the first high voltage power source to a gap present between the welding electrode and the workpiece, to break down the air present between the welding electrode and the workpiece, and to create a current conducting duct therebetween. The current output of the high voltage power source is restricted in amplitude and rate of rise. The short non-periodic high voltage pulse is superimposed by another, long, high voltage pulse from the second high voltage power source. The long pulse has a current rate of rise not exceeding that of the short pulse, and the open circuit voltage of the second high voltage power source is lower than that of the first high voltage power source. A stretched pulse appears, and the duration of the current discharge increases. The current conducting duct is heated, its electric resistance decreases and an arc is ignited. When the voltage in the current conducting duct decreases to a value less than that of the open circuit of the welding power source, the current starts flowing through the welding electrode and arc to the workpiece, resulting in a welding arc burning from the welding power source.

31 Claims, 12 Drawing Sheets

The Prior Art

METHOD AND DEVICE FOR WELDING ARC IGNITION FOR ARC WELDING APPARATUS

FIELD AND BACKGROUND OF THE INVENTION

The present invention relates to arc welding, and more particularly, to a method and device for igniting and stabilizing a welding arc of an arc welding apparatus.

Welding is a vital manufacturing technology in many industries. Welding processes are energy intensive as they require the production of high energy densities in order to create and move a pool of plasma. In most common welding methods, the energy coupling efficiency between the welding tool and a workpiece is twenty to thirty percent at best, depending upon the material and welding technology selected. Thus, significant economic benefits can be obtained if the coupling efficiency can be increased. Other aspects of the welding process, such as weld quality and productivity are also of interest and can impact the economics of the welding process.

Because all of these factors are in some way dependent upon the energy density which is incident on the workpiece, much effort has been made to increase this quantity by developing novel technologies and welding tools.

Igniting a welding arc and keeping its burning stability is essential for any welding technology. Several methods of igniting a welding arc are described, for example, in the book "*Welding Handbook* (American Welding Society), vol. 2, 8th Edition, "Welding Processes", entitled "Arc initiation methods", pp.91–93, and include scratch or touch start, pilot arc start, high-frequency start, pulse start, high-voltage DC-current start, etc.

Scratch or Touch Start:

With the power supply energized, and the shielding gas flowing from a cup, the torch is lowered toward the workpiece until the electrode makes contact with the workpiece. The torch is quickly withdrawn a short distance to establish the arc, see, for example, SU Pat. No. 703265, entitled "Protective gas metal spot welding arc ignition".

The advantage of this method of arc initiation relies in its simplicity in operation for both manual and machine welding.

The disadvantage of touch starting is the tendency of the electrode to stick to the workpiece, causing electrode contamination and transfer of metal from the electrode to the workpiece.

Pilot Arc Start:

Pilot arc starting can be used with DC welding power sources. The pilot arc is maintained between the welding electrode and the torch nozzle. The pilot arc supplies the ionized gas required to establish the main welding arc.

As shown in FIG. 1, a pilot arc starting circuit 2 which is used for gas tungsten arc spot welding consists of a welding power supply 4 and a pilot arc power supply 6, which are connected with a tungsten electrode 8 and a workpiece 10. Tungsten electrode 8 is inside a coaxial anode ring 12 and insulated gas nozzle 14. A pilot arc 16 is powered by a small auxiliary power source, namely, pilot arc power supply 6 and is started by high-frequency initiation. See, in this respect, also European patent application EP 0753371 and SU Pat. Nos. 539703 and 1623846.

High-frequency Start:

High-frequency starting can be used with DC or AC power source for both manual and automatic welding applications. High-frequency generators usually have a spark-gap oscillator or thyristor oscillator that superimposes a high-voltage AC output at radio frequencies in series with the welding circuit. Such a circuit is shown in FIG. 2. A high frequency arc starting circuit 20 consist of a welding power supply 22 and a high frequency generator 24, which includes a spark gap oscillator 26 and an air core transformer 28, which are connected with an electrode 30 and a workpiece 32. Electrode 30 is placed inside a coaxial gas nozzle 34. The high voltage generated by high frequency generator 24 ionizes the gas present between electrode 30 and workpiece 32, and the ionized gas then conducts a welding current that initiates the welding arc. See, in this respect JP 10166145 and SU 1613263 patent documents.

High-frequency generator 24 is usually connected to circuit 20 in series and performs a breakdown of an air gap present between electrode 30 and workpiece 32.

A high-frequency discharge generates a conductive duct within the gap wherein, under certain conditions, there develops an arc discharge from the welding power source. Since the source open circuit voltage does not generally exceed 60 to 150 V, it is necessary to provide high conductivity of the discharge gap to generate an arc discharge, i.e., essentially heat the high-frequency discharge duct. Therefore, high-frequency generator 24 must be of sufficiently high power. In this case, high-frequency currents flow along the welding circuit, so the latter radiates in a wide frequency range, generating an intensive level of electromagnetic disturbances for radio appliances, electronic equipment and computers. These disturbances may be harmfull to people as well.

High-voltage pulses act in the welding circuit as long as high-frequency generator 24 is operated. Typical pulse shapes 36, 38 thereof are shown in FIGS. 3 and 4.

Since radiation from high-frequency generators affects people, environment, radioelectronic appliances, control equipment and computers, the application of welding arc igniting devices based on such generators requires high quality of manufacturing the latter, as well as adequate safety measures in operation which is, in some countries, regulated by the Government. So, in the U.S. the application of such arc igniting equipment is governed by regulations of the Federal Communications Commission.

Pulse Start:

In pulse start, application of a high-voltage pulse between a tungsten electrode and a workpiece ionizes a shielding gas and establishes a welding arc.

This method is generally used with DC power supplies in machine welding applications. In this respect, see, for example, U.S. Pat. Nos. 4,061,899; and 5,365,035, European patent applications EP 0149916; and EP 0586325, and patent documents JP 05084578; JP 09038771 and SU 1613263. The arc ignition is performed by high voltage pulses transmitted to the discharge gap by means of a high frequency transformer.

The breakdown of the discharge gap by high voltage pulses causes the appearance of high frequency oscillations in the welding circuit. This results in the appearance of disturbances, which are less than at a high frequency start but great enough to affect control, radio and electronic equipment, as well as computers.

High-Voltage DC Start:

High-voltage can be used with a DC-power source mainly for automatic applications. See, for example, U.S. Pat. No. 4,123,646 and JP 06179076, EP 0585068 and SU 448091.

In high-voltage DC start, arc ignition is performed by connecting a high voltage, low power, DC-power source (10 to 15 kV at 0.01 to 0.5 A) to a discharge gap. When an arc discharge is formed, the voltage decreases below that of the open circuit of the welding power source and the current flows now from the welding power source. This method creates a very low level of disturbances. Its main disadvantage is the need for protecting the welding power source and the user from the high voltage of the DC-power source. Therefore, this method is chiefly used for automatic welding, at very small currents, typically between 10 and 20 mA.

Methods and devices for igniting a welding arc are known, directed at lowering the electric field resulting from radiation disturbance and, at the same time, providing a stable arc burning, which is also the aim of the present invention. Such methods and devices have been developed by "Matsushita Electric Ind. Co. Ltd.", Japan, and are described in U.S. Pat. No. 5,582,751 and 5,773,792, and in JP 05261536, JP 06063745, JP 06182547, JP 06254679, JP 07009137, JP 07051853, JP 08118013, JP 08300147 and EP 0585068.

Most of the devices described in the above documents include a second DC-power source connected to the circuit of the welding power source and generating high voltage, a pulse of which is applied between the welding electrode and the workpiece, igniting an arc.

FIG. 5 shows an "arc welding unit" as described in JP 10166146 of "Matsushita Electric Ind. Co. Ltd.". This device comprises a welding circuit 40, which includes a welding power supply-transformer 41 supplemented with a current control element 42 and a processor 43, a DC high voltage circuit 44 supplemented with a resistor 45, which are connected to a non-consumable electrode 47 and to workpiece 48. An output of DC high voltage circuit 44 is superimposed in parallel with an output terminal between non-consumable electrode 47 and workpiece 48, and a single high voltage pulse from high voltage pulse generating circuit 49 is superimposed in series over the output terminal by a transformer 50 for coupling. In this device, a non-load voltage from circuit 40 must be no less than 100 V and no more than 1,000 V. A single high voltage pulse with a peak value of no less than 1,000 V is generated by high voltage pulse generating circuit 49. A welding current flowing from current control element 42 is detected by a current detecting circuit 51, and the output from circuit 44, as well as the output from high voltage pulse generating circuit 49 arc stopped.

The high voltage pulse creates a conducting duct in a gap present between electrode 47 and workpiece 48, wherein an arc discharge is developed from welding power source 41. Simultaneously with the application of a high voltage pulse, the conductive duct receives high DC-voltage from circuit 44 to at least partially suppress high frequency disturbances.

A drawback of the described device is that the voltage pulse generator operates during the whole period of arc ignition, transmitting high voltage pulses and creating a set of pulses of high frequency continuous oscillations in the transformer winding and the entire welding circuit.

High frequency currents flow along the welding circuit during the entire period of the high frequency pulse generator and the welding circuit emits electromagnetic radiation within a wide frequency range, creating an intensive level of electromagnetic disturbances dangerous to control, radio and electronic equipment, as well as to computers. In addition, within the entire period, the electrode and workpiece receive high (up to 1000 V) voltage, so special measures must be taken to protect the user.

There is thus a widely recognized need for, and it would be highly advantageous to have, a method and device for igniting a welding arc in an arc welding apparatus, which permit to essentially reduce the time required for arc ignition and lower the electromagnetic disturbances level to a minimum.

SUMMARY OF THE INVENTION

The present invention relates to a method and device for welding arc ignition in an arc welding apparatus, effected by high-voltage discharge between a welding electrode of the welding apparatus and a workpiece.

The method of igniting a welding arc according to preferred embodiments of the present invention includes several successive steps as follows:

First, a welding electrode and a workpiece are connected with a welding power source. Then, the electrode and the workpiece are simultaneously connected to at least two additional high voltage power sources. Thereafter, a short a periodic high voltage pulse is transmitted from the first high voltage power source to a gap present between the welding electrode and the workpiece, to break down, by an electric discharge, the air present between the welding electrode and the workpiece, and to create a current conducting duct therebetween. In this way, the current output of the high voltage power source is restricted in amplitude and rate of rise. Next, the short non-periodic high voltage pulse is superimposed by another, long, high voltage pulse from the second high voltage power source. The long pulse has a current rate of rise not exceeding that of the short pulse, and the open circuit voltage of the second high voltage power source is lower than that of the first high voltage power source. As a result, a stretched pulse appears, and the duration of the current discharge increases. As a consequence, the current conducting duct is heated, its electric resistance decreases and an arc is ignited. When the voltage in the current conducting duct decreases to a value less than that of the open circuit of the welding power source, the current starts flowing from the latter through the welding electrode and arc to the workpiece and, as a result, a welding arc develops, burning from the welding power source.

According to further features in preferred embodiments of the invention described below, the high voltage short pulse is transmitted from the first high voltage power source within 1 to 10 microseconds, at a voltage of 0.5 to 15 kV and at a current of 1 to 10 A.

According to still further features in the described preferred embodiments the long high voltage pulse is transmitted from the second high voltage power source within 0.1 to 100 microseconds, at a voltage of up to 1 kV.

According to still further features in the described preferred embodiments, the open circuit voltage of the welding power source is preferably 60 to 100 V.

According to still further features in the described preferred embodiments, the first high voltage power source is, in effect, a current pulse generator connected with a primary winding of a current transformer, while the secondary winding of the transformer is connected to the circuit of the welding power source in series.

According to still further features in the described preferred embodiments the second high voltage power source is, in effect, a current pulse generator connected with the circuit of the welding power source in parallel. According to still further features in the described preferred embodiments currents flowing along the primary and secondary windings of the current transformer exhibit:

$$\left|\frac{I_{1(t)} - K \cdot I_{2(t-t_0)}}{I_{1(m)}}\right| < 10\%$$

where $I_{1(t)}$ and $I_{2(t-t0)}$ are instantaneous current values in the primary and secondary transformer windings respectively; K is the transformation ratio of the transformer; $I_{1(m)}$ is the maximum current value in the transformer primary winding; (is the current time; and $t_0$ is the time lag of current pulse in the secondary winding in relation to current pulse in the primary winding.

According to the present invention, the welding arc ignition device can be designed both for an arc DC-welding apparatus and an arc AC-welding apparatus.

A welding arc ignition and stabilization device for an arc DC-welding apparatus, operating via a high voltage discharge between a welding electrode and a workpiece comprises, according to preferred embodiments of the invention, a first high voltage power source for generating a short, high voltage pulse and a second high voltage power source for generating a long, high voltage pulse.

According to still further features in the described preferred embodiments an outlet of the first power source is connected with a transformer's primary winding, whereas the transformer's secondary winding is connected in series with a circuit of a welding power source.

According to still further features in the described preferred embodiments the second high voltage power source is connected in parallel with the circuit of the welding power source.

According to still further features in the described preferred embodiments the first power source is provided with an operation synchronizer, the inlet of which being connected with an outlet of the second power source.

According to still further features in the described preferred embodiments the welding arc ignition device is designed as an integral part of an arc welding apparatus and is additionally provided with a control device connected with the outlets of the welding power source and is designed to switch on the second power source every time when the welding power source is switched on.

According to still further features in the described preferred embodiments the first power source is deigned to emit a short high voltage pulse and includes a thyristor pulse generator with a DC power source and energy-storage capacitor, and has a discharge circuit with a current limiting element connected to an output of the pulse generator between the output and the energy storage capacitor.

According to still further features in the described preferred embodiments the thyristor pulse generator comprises a charging thyristor, a high resistance charging resistor, an energy-storage capacitor, a discharge thyristor, and a current limiting element—a discharge resistor. Preferably, the energy-storage capacitor has a capacity up to 1 microfarad, and the discharge circuit of the thyristor pulse generator includes a discharge resistor and an inductor connected in series thereto. The discharge circuit elements exhibit:

$$R_0 = \sqrt{\frac{L_0}{C_0}}$$

where $R_0$ is the discharge circuit resistance; $L_0$ is the inductor inductivity; and $C_0$ is the capacity of the energy-storage capacitor.

According to still further features in the described preferred embodiments the second power source, which is designed to generate the long high voltage pulse, comprises at least one thyristor pulse generator with an energy-storage capacitor, which is connected with the welding electrode and the workpiece via a resistor limiting the discharge current.

According to still further features in the described preferred embodiments the second power source may as well comprise at least two thyristor pulse generators, the outlets thereof are connected in parallel, and the generators are provided with a control device to switch them on in an order defined by the control device.

According to still further features in the described preferred embodiments, the second power source may be designed as a voltage-controlled current source provided with a control circuit. In this case, the open circuit voltage of this source is at least 100 V, the source outlet is connected in parallel with the outlet of the welding power source and the control circuit is connected with the control device.

According to still further features in the described preferred embodiments the second power source may alternatively be a current-controlled power source based on a transistor generating smoothed high voltage pulses. In this case, an emitter of the transistor is connected, via a resistor, to a respective outlet of the DC welding power source, a collector of the transistor is connected to the pulse generator outlet, and a transistor base of the transistor is connected to the control device, the voltage thereof specifies a current of a certain form at the pulse generator outlet, and in this case:

$$I = \frac{U_c - U_{BE}}{R}$$

where I is the outlet generator pulse current; $U_c$ is the control device voltage; $U_{BE}$ is the voltage between the base of the transistor and the emitter thereof; and R is the resistor resistance in the circuit of the transistor emitter.

A welding arc ignition and stabilization device for an arc AC-welding apparatus, operated by a high voltage discharge between a welding electrode and a workpiece comprises, according to preferred embodiments of the present invention, a first and a second high voltage pulse generating power sources and a synchronizer for synchronizing their operation.

According to still further features in the described preferred embodiments the first power source is designed to emit short, high voltage pulses and an outlet of this power source is connected with a transformer's primary winding, whereas a secondary winding of the transformer is connected in series with a circuit of a welding power source.

According to still further features in the described preferred embodiments the second high voltage pulse power source is connected in parallel with the circuit of the welding power source and is designed to emit long high voltage pulses. Preferably, the synchronizer of the first and second power sources has an inlet connected with an outlet of the welding power source, and outlets thereof are connected with the first and second high voltage pulse power sources.

According to still further features in the described preferred embodiments the welding arc ignition device for an arc AC welding apparatus is designed as an integral part of the welding apparatus itself. It is preferably provided with a control device connected with the welding power source outlets of the arc welding apparatus and which is used to actuate the second power source every time when the welding power source is actuated.

According to still further features in the described preferred embodiments the welding arc ignition device for an arc AC-welding apparatus may alternatively be designed as a separate unit attached to the arc AC-welding apparatus and electrically connected with the outlets of the welding power source thereof via a diode connected in series with the power source circuit in current direction. In this case, the device is preferably provided with a remote control device shaped as a separate unit located close to the welding electrode on the welding power source, or in any other suitable place.

According to still further features in the described preferred embodiments the first high voltage pulse power source which is used to emit short high voltage pulses comprises two thyristor pulse generators with DC power sources and energy-storage capacitors. Preferably, each of the thyristor pulse generators has a charging circuit including an energy-storage capacitor and a charging thyristor, and is connected, via a common current limiting element common for both generators, to one pole of the DC-power source, and a discharge circuit including a discharge thyristor and the common current limiting element. The discharge circuits of the pulse generators are connected to opposite outlets of the transformer's primary winding. and the winding midpoint is connected to the free pole of the DC-power source.

According to still further features in the described preferred embodiments each of the thyristor pulse generators comprises a charging thyristor, a high resistance charging resistor, an energy-storage capacitor, a discharge thyristor and a current limiting element—discharging resistor. In addition, each of the thyristor pulse generators preferably further comprises an energy-storing capacitor with a capacity of up to 1 microfarad, and the discharging circuit includes a discharging resistor and an inductor connected in series, the discharging circuit elements exhibit:

$$R_0 \geq \sqrt{\frac{L_0}{C_0}}$$

where $R_0$ is the discharge circuit resistance; $L_0$ is the inductor inductivity; and $C_0$ is the capacity of the energy-storage capacitor.

According to still further features in the described preferred embodiments the second power source, which is designed to emit a long high voltage pulse, comprises at least two thyristor pulse generators supplemented with energy-storage capacitors. Each of the generators is connected by the first of its outlets directly with the workpiece, and by the second outlet thereof, via a resistor for limiting the discharge current and a discharge thyristor, with the welding electrode. In this case, the first of the energy-storage capacitors is connected via its second outlet via a charging thyristor and a current limiting element with the positive pole of the respective DC power source, and the second energy-storage capacitor is connected via a charging thyristor and a current limiting element to the negative pole of the respective DC power source, the free opposite poles of the DC power sources being connected together and with the workpiece.

According to still further features in the described preferred embodiments the second high voltage pulse power source, which is designed to emit a long high voltage pulse, further comprises two antiparallel voltage-controlled current sources, each of them having a control circuit. The open circuit voltage of the sources is preferably at least 100 V, the outlets of the voltage controlled current sources are connected in parallel with the outlet of the welding power source, and the control circuits are connected with the synchronizer.

According to still further features in the described preferred embodiments, the second high voltage pulse power source may further comprise two antiparallel current-controlled current sources, each having a control circuit, and the open circuit voltage of the sources is of at least 100 V. In this case, the outlets of the current-controlled current sources are connected in parallel with the outlet of the welding power source, and the control circuits with the synchronizer.

Further objects and advantages of the present invention will become apparent from the following detailed description and accompanying drawings.

BRIEF DESCRIPTION OF THE DRAWINGS

The invention herein described, by way of example only, with reference to the accompanying drawings, wherein.

Figure 1:
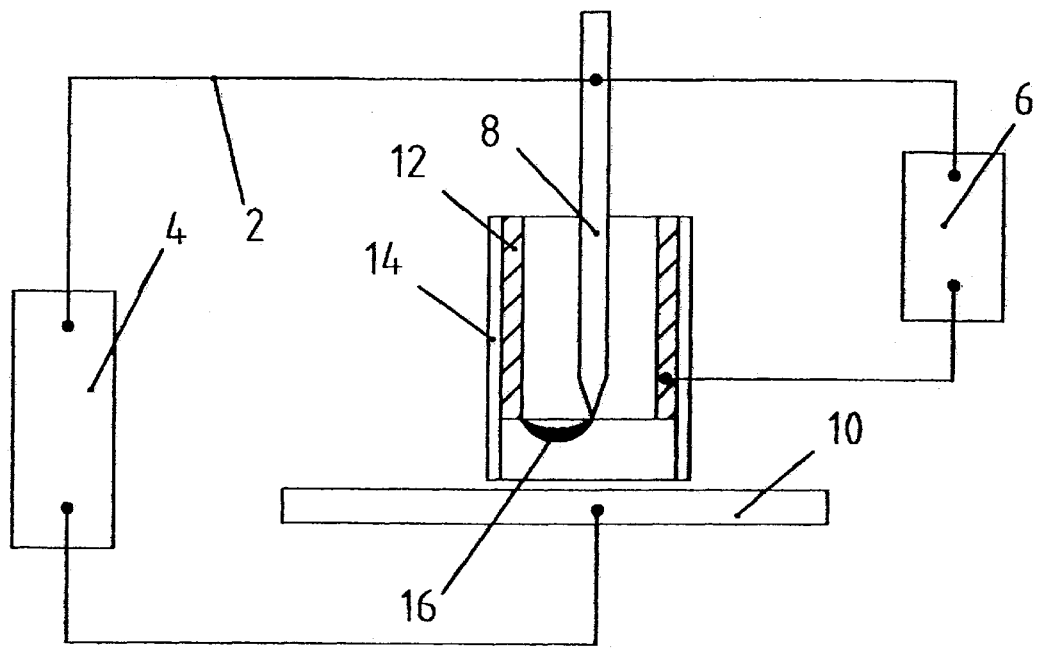
FIG. 1 shows a prior art pilot arc starting circuit used for tungsten inert gas welding (FIG)
Figure 2:
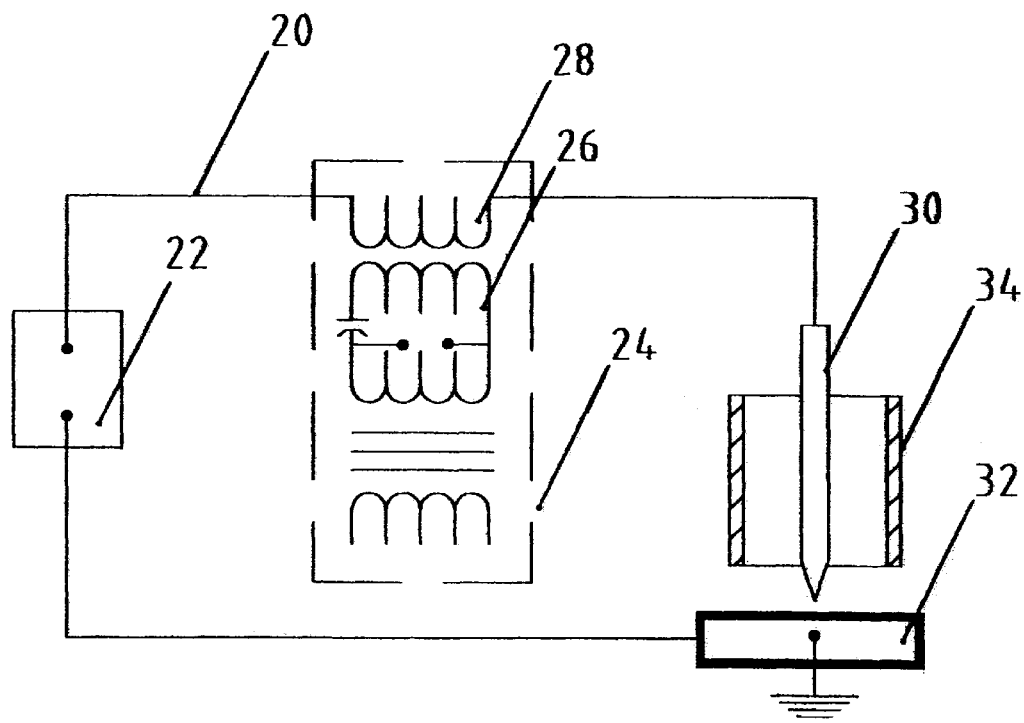
FIG. 2 shows a prior art high frequency arc starting.
Figure 3:
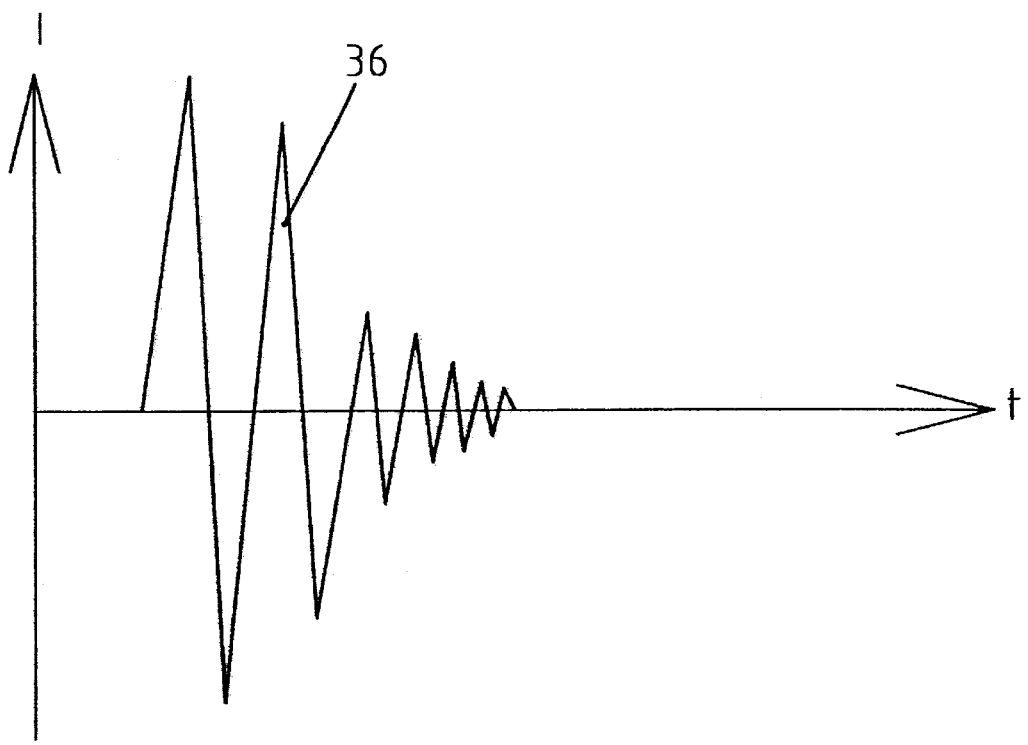
FIGS. 3 and 4 show typical shapes obtained using prior art high frequency generator pulses.
Figure 4:
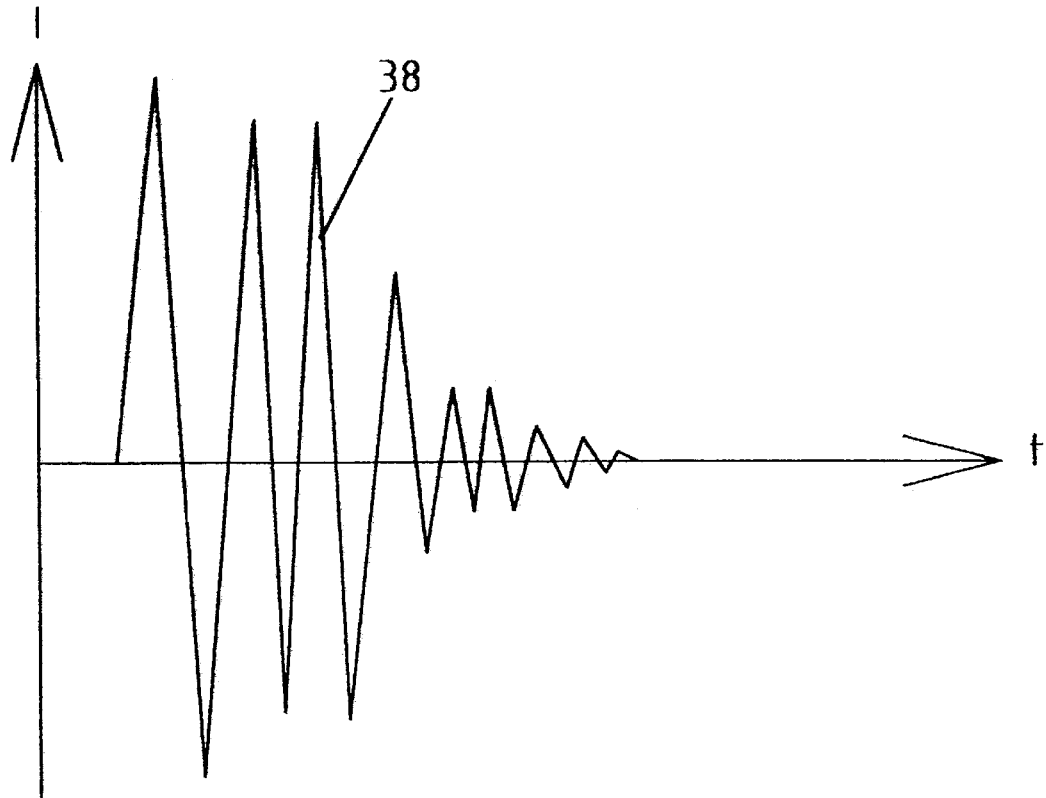
Figure 5:
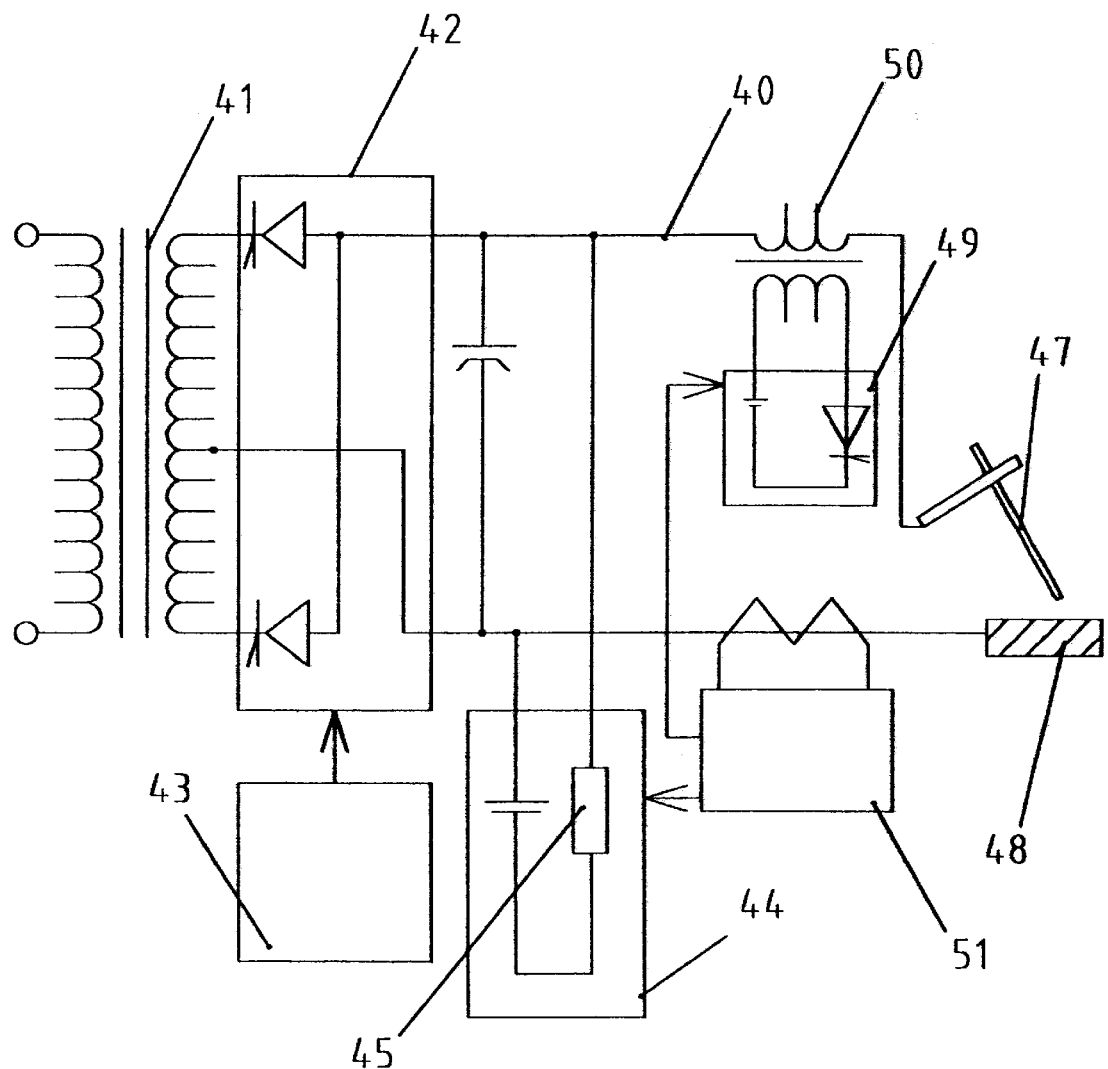
FIG. 5 shows components of a prior art arc welding unit.

Various electronic components, recognizable to those skilled in the art, and not requiring elaboration, have been labeled 500.

DESCRIPTION OF THE PREFERRED EMBODIMENTS

The present invention is of a method and device for igniting and stabilizing a welding arc which can be used for igniting and stabilizing a welding arc of an arc welding apparatus. Specifically, the present invention can be used to provide a novel power source for arc ignition, diminishing the high frequency oscillation characterizing the prior art, and which dramatically increases the reliability of automated or semiautomated and robotically controlled welding systems.

The principles and operation of a method and device according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 6–10 illustrate some general features and preferred embodiments of a device for welding arc ignition and stabilization according to the present invention.

Figure 6A:
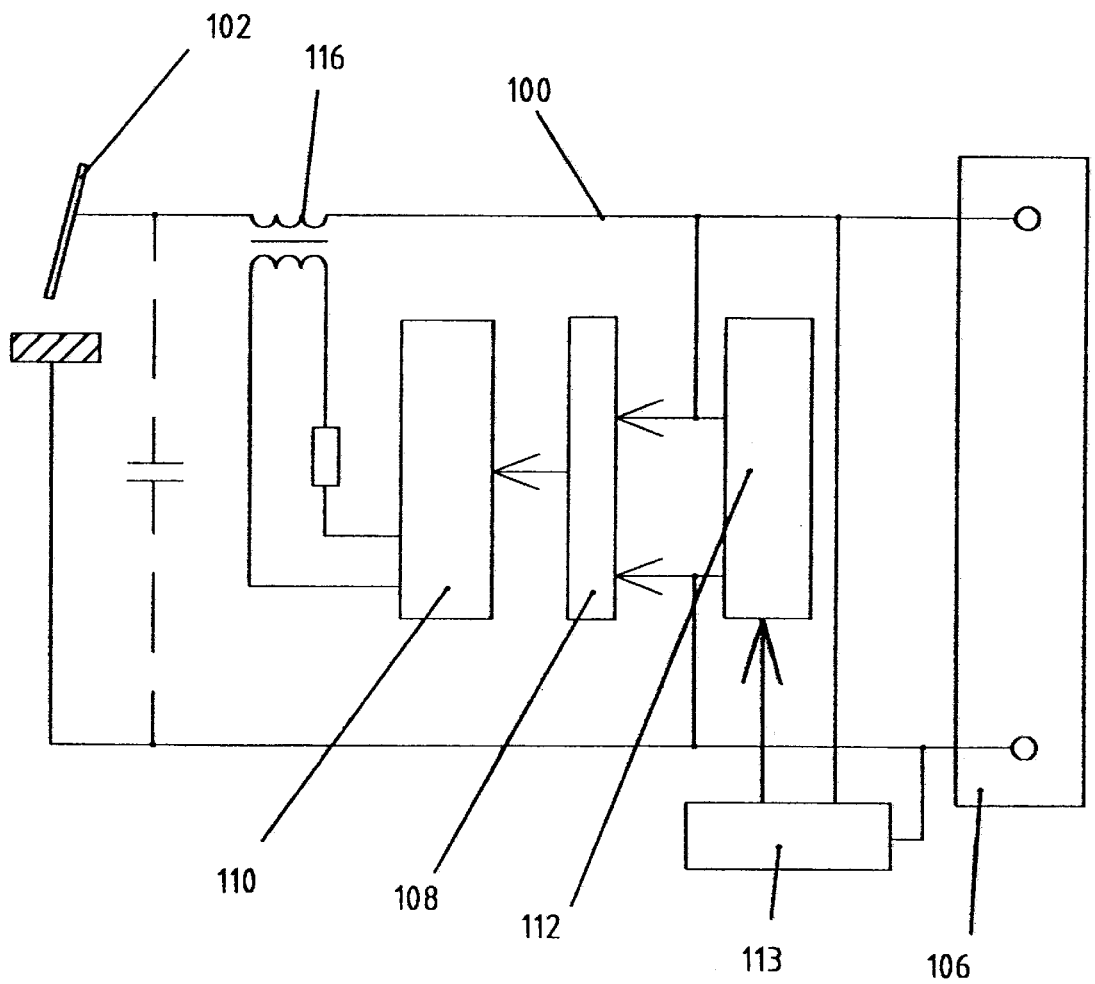
FIGS. 6a–c show block diagrams of a device according to the present invention.
Figure 6B:
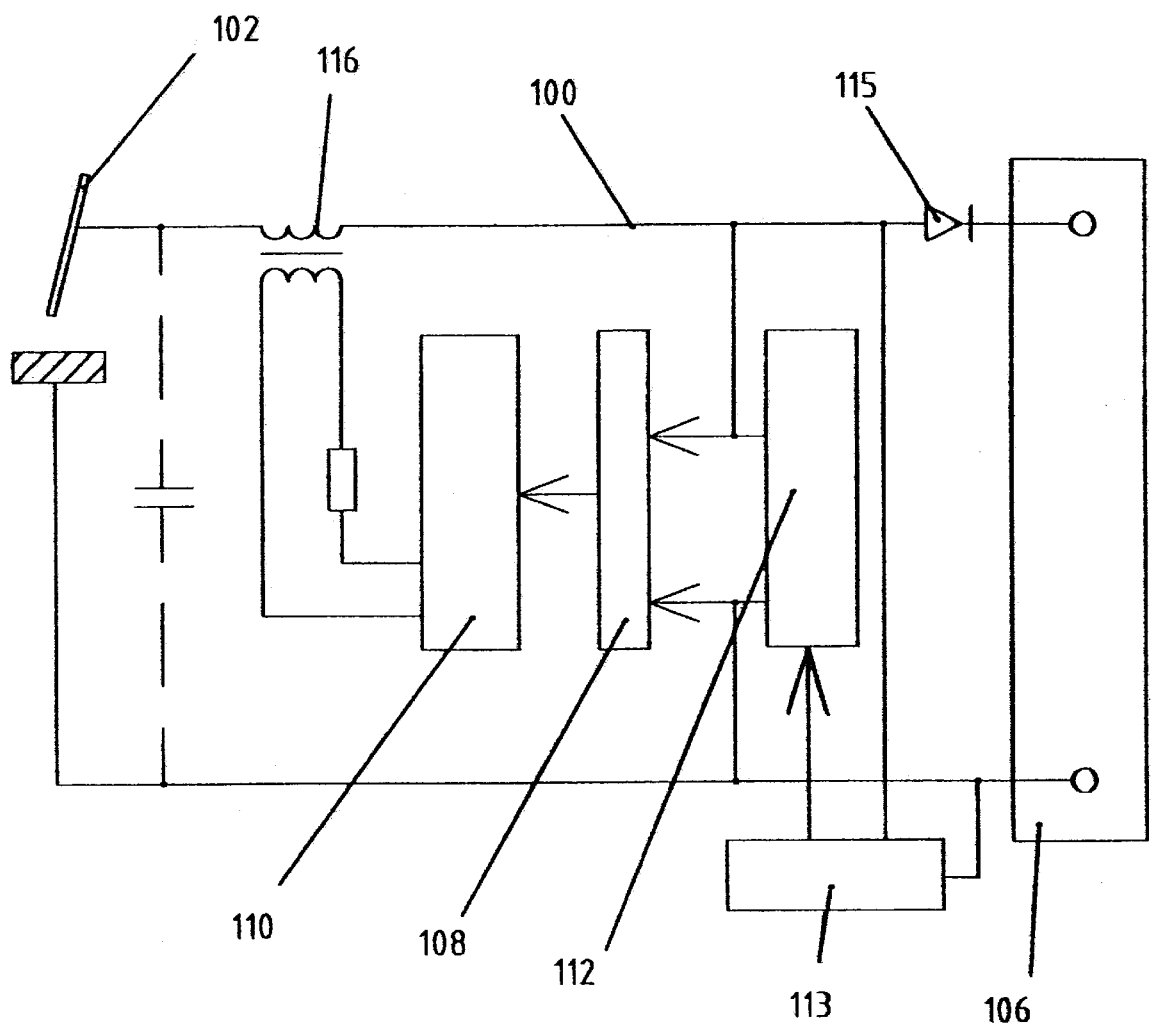
Figure 6C:
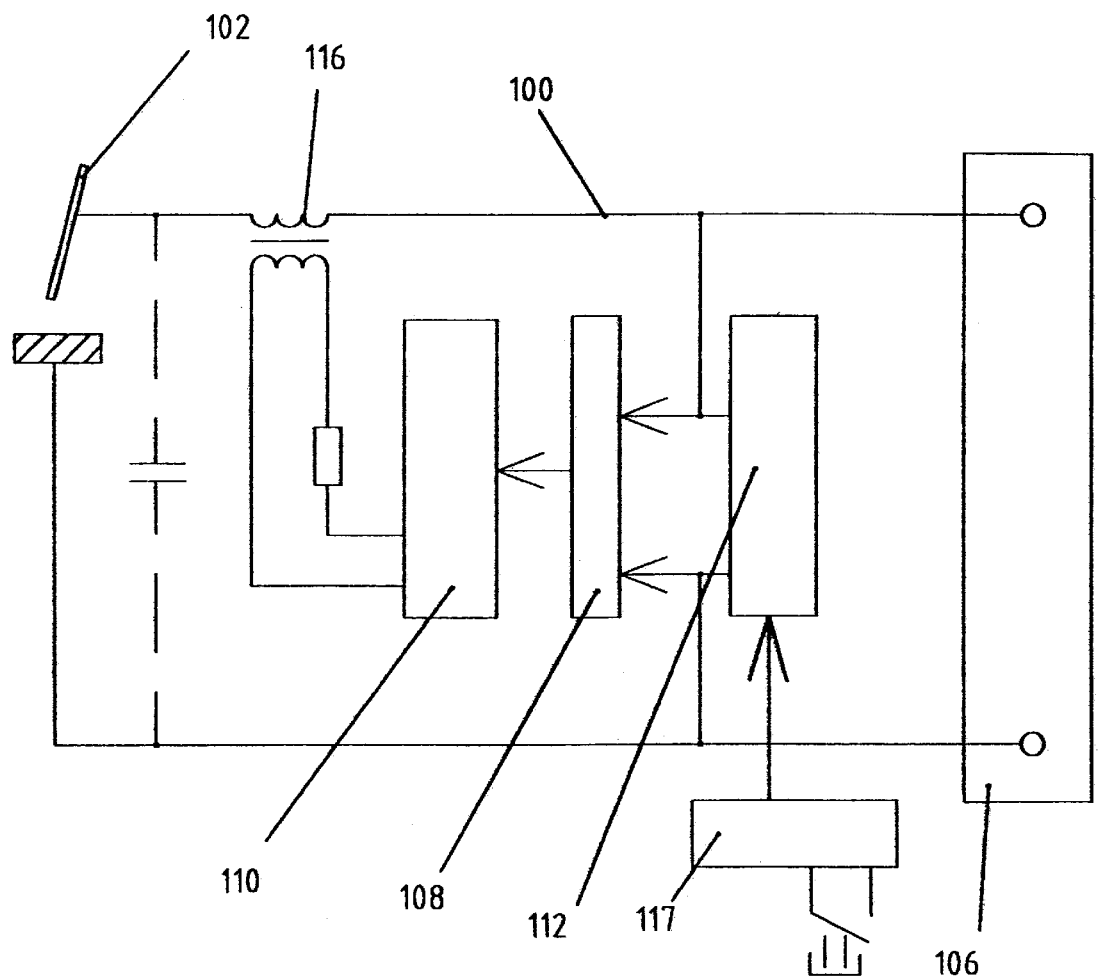

A block diagram of the device according to the present invention is shown in FIG. 6. The device is built into an electric circuit 100 designed for feeding a welding electrode 102 and a workpiece 104 from a welding power source 106.

The device shown in FIG. 6 includes a first high voltage power source 110, designed to emit a short high voltage pulse provided with a synchronizer 108, and a second high voltage power source 112, designed to emit a long high voltage pulse. Both high voltage power sources 110 and 112 are connected by synchronizer 108. Both high voltage power sources 110 and 112 are connected with circuit 100, wherein first source 110 is connected in series with welding circuit 100 via a transformer 116, and second source 112 is connected in parallel with welding power source 106.

The welding arc ignition device according to the present invention may be an integral part of an arc welding apparatus. However, it may alternatively be a separate unit attached to an arc welding apparatus and electrically connected with the outlets of welding power source 106 thereof, the outlets being connected with welding electrode 102 and workpiece 104.

In the first case, the welding arc ignition device is additionally provided with a control device 113 (FIG. 6a) connected with the power source outlets of the arc welding apparatus and designed to switch on, second high voltage pulse power source 112 every time when welding power source 106 is switched on.

In the second case the welding arc ignition device is a separate unit attached to an arc welding apparatus and electrically connected with the outlets of arc welding power source 106 via a diode 115 (FIG. 6b), connected in series with circuit of power source 106 in current direction. The device is preferably provided with a remote control device 117. This remote control device may be designed as a separate block located close to welding electrode 102, on the welding power source 106 or at any suitable place circuit 100.

Figure 7:
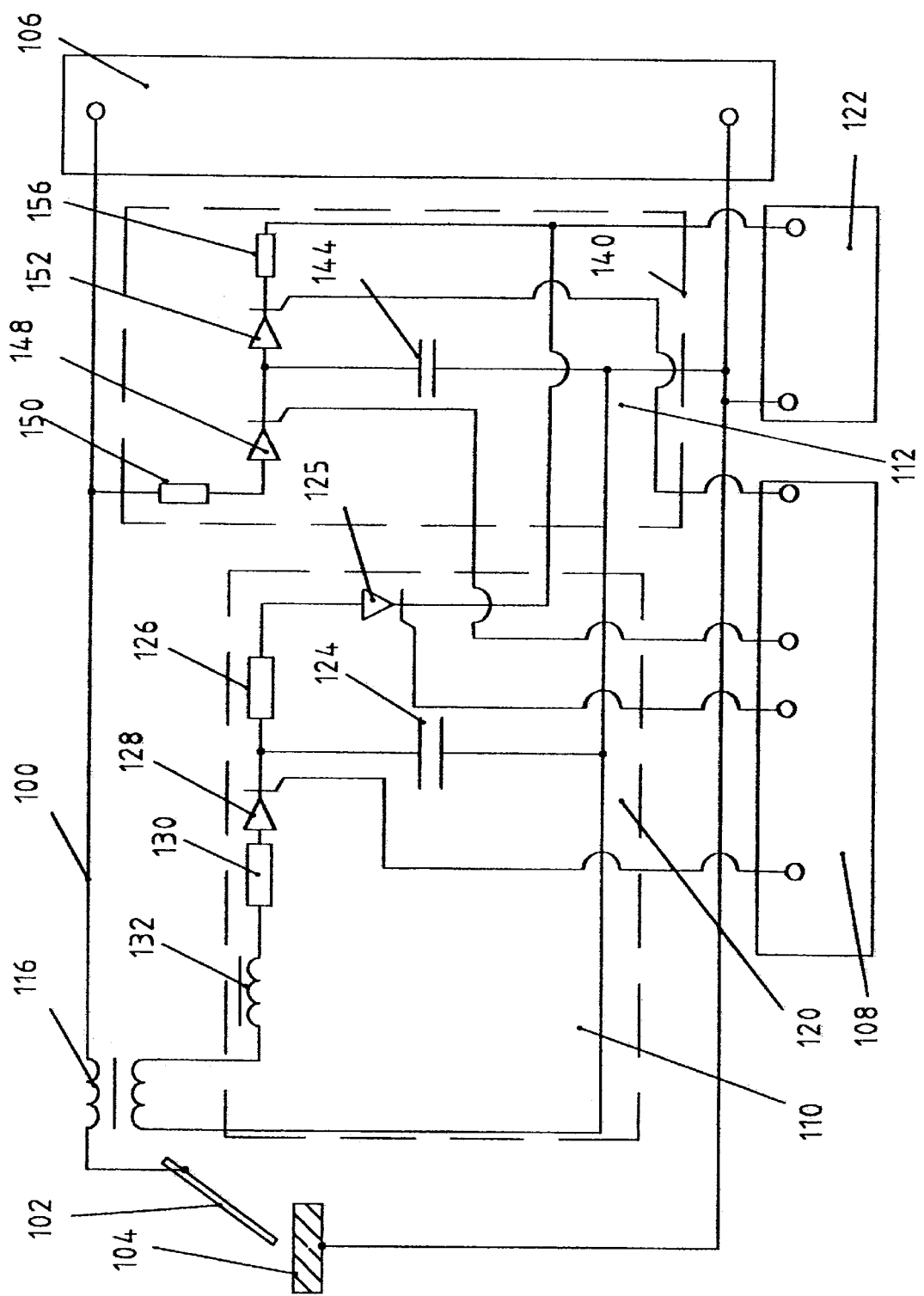
FIGS. 7 and 8 show a diagram of a device for welding arc ignition for an arc DC-welding apparatus according to the present invention.
Figure 8:
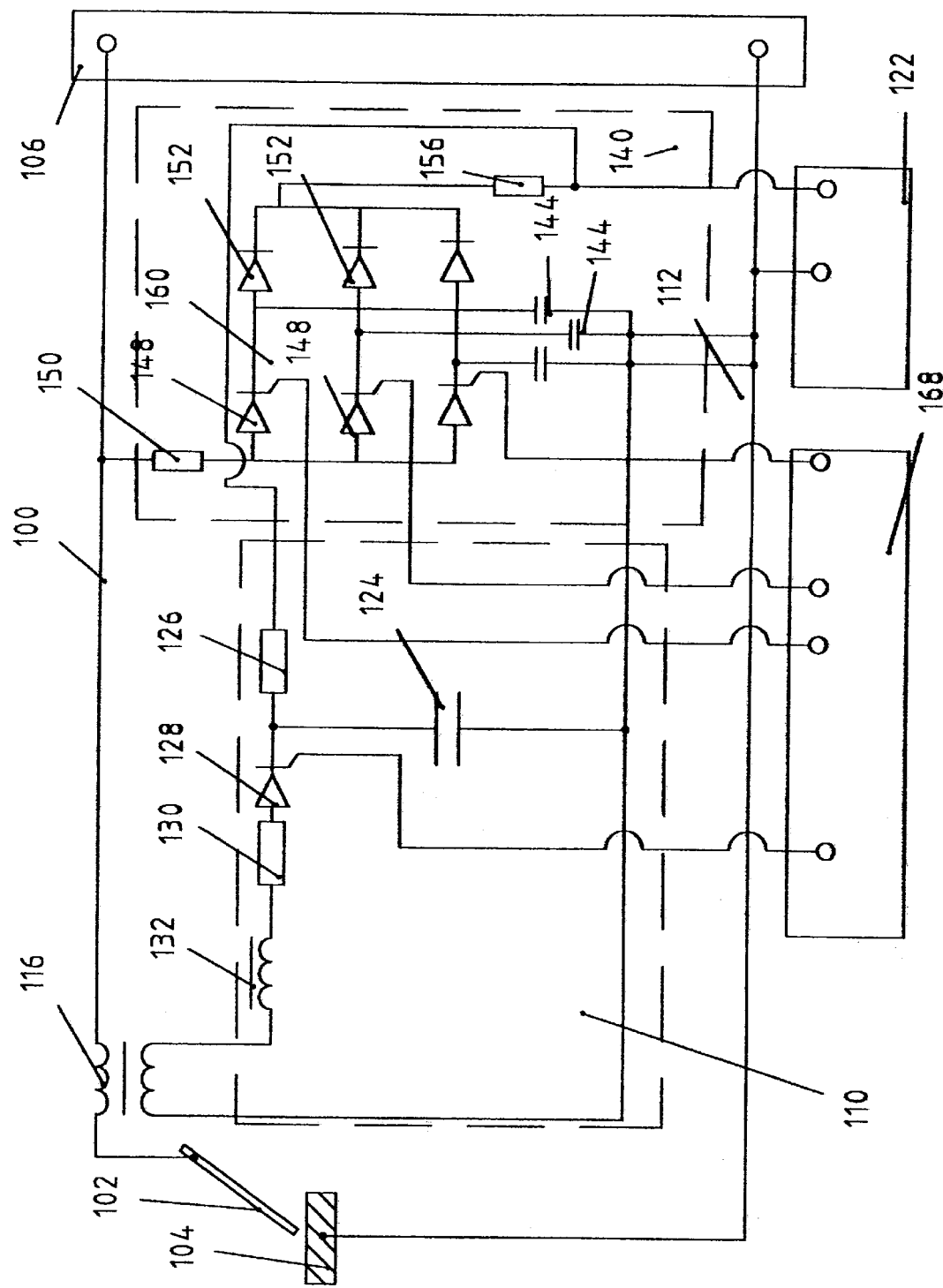
Figure 9A:
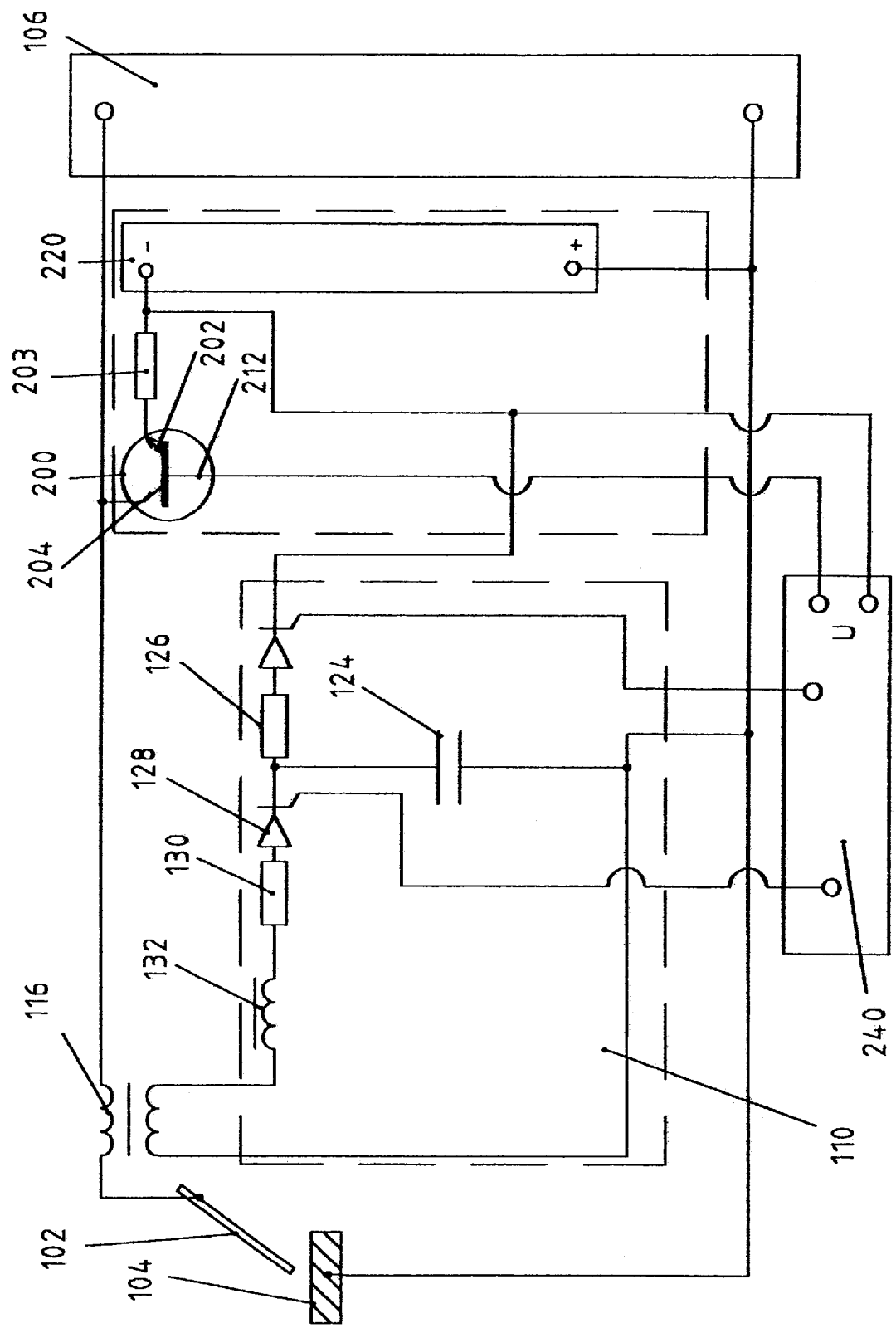
FIGS. 9a–b show a diagram of a device for welding arc ignition for an arc AC-welding apparatus according to the present invention.
Figure 9B:
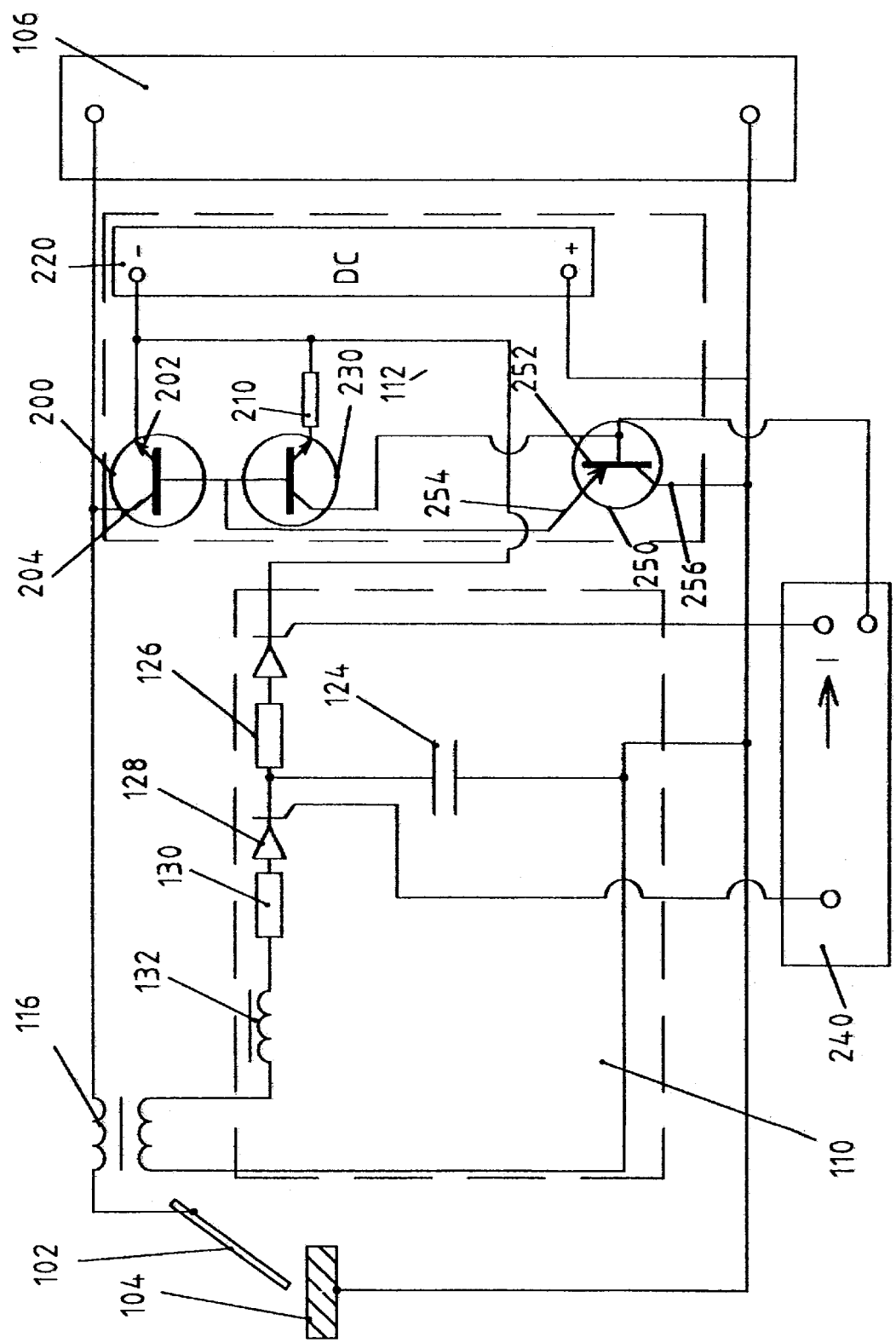
Figure 10:
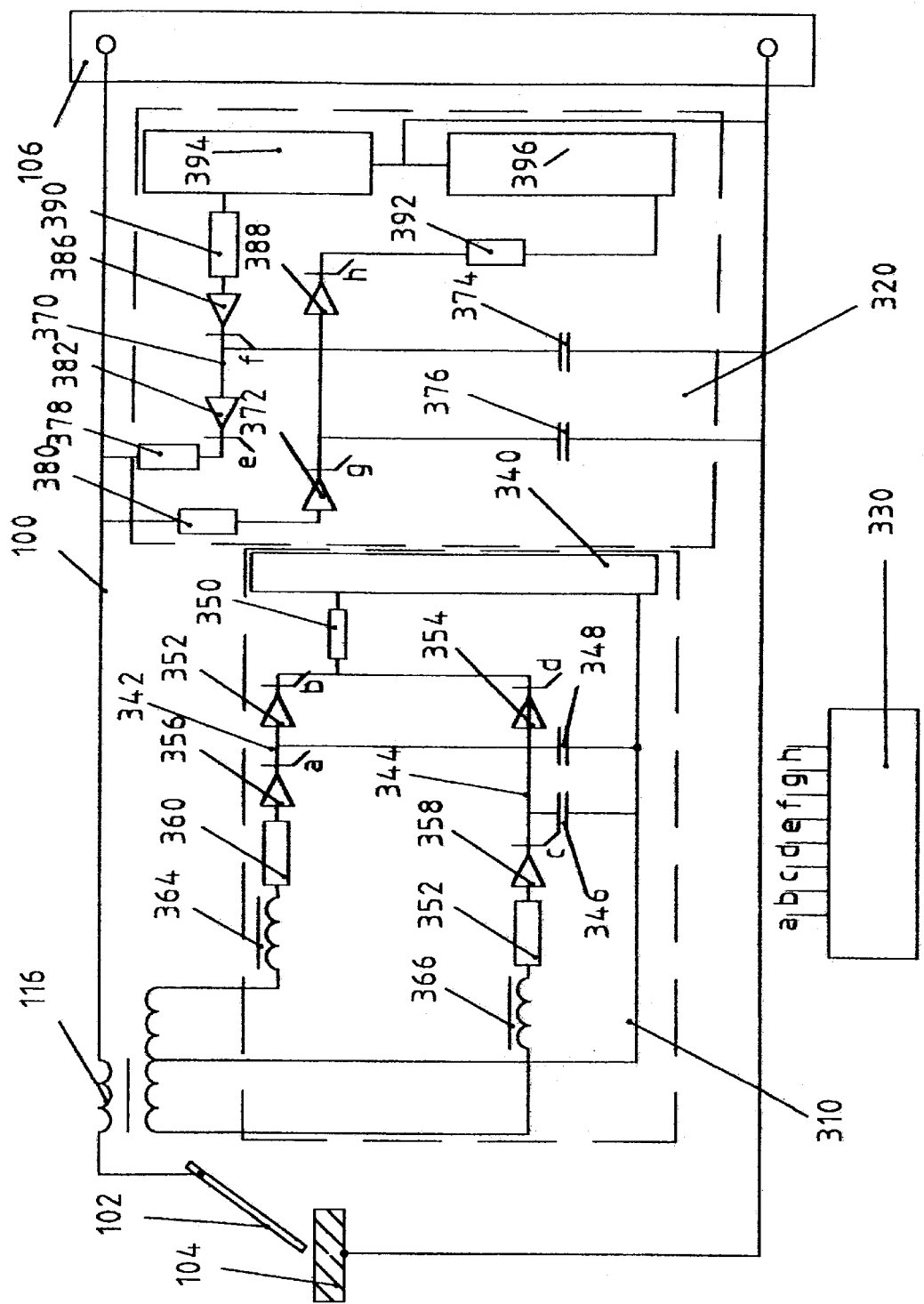
FIG. 10 shows a diagram of a device for welding arc ignition based on thyristors according to the present invention.

According to the present invention, the welding arc ignition device may be designed both for an arc DC-welding apparatus, as specifically shown in FIGS. 7–9, and an arc AC-welding apparatus as specifically shown in FIG. 10.

Thus, a welding arc ignition device for a DC arc welding apparatus is shown in FIGS. 7–9 and includes a first high voltage power source 110 designed to generate a short high voltage pulse, and a second high voltage power source 112 designed to generate a long high voltage pulse. The outlet of first power source 110 is connected with a transformer's 116 primary winding, whereas the transformer's 116 secondary winding is connected in series with the circuit of a welding power source 106. Second high voltage power source 112 is connected in parallel with that circuit. First high voltage pulse power source 110 is provided with an operation synchronizer 108, the inlet thereof is connected with the outlet of second high voltage pulse power source 112.

First high voltage power source 110, which is designed to emit a short high voltage pulse, comprises a thyristor pulse generator 120 with a DC-power source 122 and an energy-storage capacitor 124. Thyristor pulse generator 120 comprises a charging thyristor 125, a high resistance charging resistor 126, an energy-storage capacitor 124, a discharge thyristor 128, and a current limiting element—a discharge resistor 130. Generator 120 has a discharge circuit with a current limiting element—discharge resistor 130 connected to the outlet of pulse generator 120 between the outlet and the energy storage capacitor 124.

Energy-storage capacitor 124 has a capacity up to 1 microfarad, and the discharge circuit of thyristor pulse generator 120 includes a discharge resistor 130 and inductor 132 connected in series, the discharge circuit elements exhibit:

$$R_0 \geq \sqrt{\frac{L_0}{C_0}}$$

where $R_0$ is the discharge circuit resistance; $L_0$ is the inductor inductivity; and $C_0$ is the capacity of the energy-storage capacitor.

Second high voltage power source 112, which is designed to generate a long high voltage pulse, comprises at least one thyristor pulse generator 140 with an energy-storage capacitor 144, and a discharge thyristor 148 connected with welding electrode 102 and workpiece 104 via a resistor 150 for limiting the discharge current. Generator 140 further comprises a charging thyristor 152 and a high resistance charging resistor 156.

Second high voltage pulse power source 112 may as well comprise at least two thyristor pulse generators 160 (shown in FIG. 8) the outlets thereof are connected in parallel, and the generators 160 are provided with a control device 168 to switch them on in an order defined by the device.

Furthermore, as specifically shown in FIG. 9a, second high voltage pulse power source 112 may be designed as a voltage-controlled current source controlled by a control circuit 240. In this case, an emitter 202 of a transistor 200 is connected with a respective outlet of a DC-power source 220 via resistor 203. A collector 204 of transistor 200 is connected with a circuit of welding power source 106, whereas, a base 212 of transistor 200 is connected with a control device 240.

In this case the open circuit voltage of source 112 is preferably at least 100 V, source's 112 outlet is connected in parallel with the outlet of welding power source 106 and the control circuit is connected with control device 168.

Finally, as specifically shown in FIG. 9b, second pulse power source 112 may alternatively be a current-controlled current source controlled by control device 240, the open circuit voltage of this source is preferably at least 100 V. The outlet of the source is connected in parallel with the outlet of welding power source 106, and control device 240 with control device 168. Second power source 112 may be a current-controlled current source based on a powerful high voltage transistor 200 which serves generating smoothed high voltage pulses (FIG. 9b). In this case, an emitter 202 of transistor 200 is connected to a respective outlet of a DC-power source 220, a collector 204 of transistor 200 is connected to the circuit of welding power source 106, and a base 212 of transistor 200 is connected with a base of a low voltage transistor 230, the emitter thereof, via a resistor 210, is connected with the outlet of source 110, and collector 204 is connected to the inlet of a control device 240, the voltage thereof defining a current of a certain form at the pulse generator outlet, and in this case:

$$I = \frac{U_c - U_{BE}}{R}$$

where I is the outlet pulse generator current; $U_c$ is the control device voltage; $U_{BE}$ is the voltage between the base of the transistor and the emitter thereof, and R is the resistor resistance in the circuit of the transistor emitter.

A transistor 250 designed to amplify the control signal of current transfer ratio is connected at base 252 thereof with the inlet of control device 240, by an emitter 254 thereof to the bases of transistors 200 and 230, and by a collector 256 thereof to DC-power source 220.

FIG. 10 shows a welding arc ignition and stabilization device for an arc AC-welding apparatus according to the present invention. The device comprises a first and a second high voltage pulse power sources 310 and 320, respectively, and a synchronizer 330 for synchronizing their operation.

First high voltage pulse power source 310 is designed to emit short high voltage pulses. The outlet of power source 310 is connected with a transformer's 116 primary winding, whereas the secondary winding of transformer 116 is connected in series with the circuit of welding power source 106. A second high voltage pulse power source 320 is connected in parallel with the circuit of welding power source 106 and is designed to emit long high voltage pulses. The operation synchronizer 330 of first 310 and second 320 pulse power sources has an inlet connected with the outlet of welding power source 106, and the outlets thereof are connected with first 310 and second 320 high voltage pulse power sources.

First high voltage pulse power source 310, which is used to emit short high voltage pulses, comprises two thyristor pulse generators 342 and 344 respectively, with a DC-power source 340 and energy-storage capacitors 346 and 348. Each of thyristor pulse generators 342 and 344 has a charging circuit including an energy-storage capacitor, 346 and 348, respectively, and a charging thyristor, 352 and 354, respectively. Generators 342 and 344 are connected, via a current limiting element 350, which is common for both generators 342 and 344, to one pole of a DC-power source 340. Each of thyristor pulse generators 342 and 344 further has a discharge circuit including a discharge thyristor 356 and 358, respectively, and a current limiting element 360 and 362. The discharge circuits of pulse generators 342 and 344 are connected to opposite outlets of transformer's 116 primary winding, and the winding's midpoint is connected to the free pole of DC-power source 340. Each of thyristor pulse generators 342 and 344 further comprises an energy-storage capacitor, 346 and 348, respectively, with a capacity of up to 1 microfarad. The discharge circuits include resistors 360 and 362 and inductors 364 and 366, the discharge circuit elements exhibit:

$$R_0 \geq \sqrt{\frac{L_0}{C_0}}$$

where $R_0$ is the discharge circuit resistance; $L_0$ is the inductor inductivity; and $C_0$ is the capacity of the energy-storage capacitor.

Second high voltage pulse power source 320, which is designed to emit a long high voltage pulse, comprises at least two thyristor pulse generators 370 and 372 with energy-storage capacitors 374 and 376. Each of generators 370 and 372 is connected by one of its outlets directly with workpiece 104, and by the second outlet, via a resistor which serves for limiting the discharge current, 378 and 380, respectively, and further via a discharge thyristor, 382 and 384, respectively, with welding electrode 102. In this case, the first of energy-storage capacitor 374 is connected by its second outlet, via a charging thyristor 386, and a current limiting element 390, with the positive pole of a respective DC-power source 394. The second energy-storage capacitor 376 is connected via a charging thyristor 383 and a current limiting element—resistor 392, to the negative pole of a respective DC power source 396, whereas the free opposite poles of DC-power sources 394 and 396 are connected together and with workpiece 104.

Second high voltage pulse power source 320, which is designed to emit along high voltage pulse, comprises two antiparallel voltage-controlled current sources, each of them is controlled by the outlet of synchronizer 330, which therefore forms a control circuit (see FIG. 10). The open circuit voltage of the sources is at least 100 V, the outlets of the voltage controlled current sources are connected in parallel with the outlet of welding power source 106, and the control circuits are connected with synchronizer 330.

Furthermore, second high voltage pulse power source 320, which is is designed to emit a long high voltage pulse, may further comprise two antiparallel current-controlled current sources, each is controlled by an outlet of synchronizer 330, which therefore forms a control circuit (see The open circuit voltage of the sources is at least 100 V. In this case, the outlets of the current-controlled current sources are connected in parallel with the outlet of welding power source 106, and the control circuits with synchronizer 330.

According to the method of the present invention welding arc ignition by a high voltage electric breakdown of a discharge gap present between welding electrode 102 and workpiece 104 is performed in several steps.

When welding electrode 102 and workpiece 104 are connected to welding power source 106, they are simultaneously connected to two additional high voltage pulse power sources 110 and 112. Then, a required gap is set between welding electrode 102 and workpiece 104 and a short a periodic high voltage pulse is transmitted from first high voltage pulse power source 110 to welding electrode 102. Since the voltage of source 110 is beyond doubt greater than the breakdown voltage, the discharge gap between the welding electrode 102 and workpiece 104 is broken down and a spark discharge occurs, the duration of which is limited by the capacity and inductivity of the current conductors connecting welding power source 106 with electrode 102 and workpiece 104. As a result, a narrow current conducting duct is formed.

Then, the short high voltage pulse is superimposed by another, long high voltage pulse from second high voltage a pulse power source 112 which is necessary to heat up the current conductive duct, reducing its electric resistance and to thereby ignite an arc. When the resistance in the conducting duct is reduced to a value less than the open circuit voltage of welding power source 106, the power from the latter is delivered to welding electrode 102 and workpiece 104, and an arc discharge is developed and burns.

Recall that first high voltage pulse source 110 is connected to the circuit of welding power source 106 via current transformer 116, and second high voltage pulse power source 112 is connected thereto in parallel. Transformer 116 transmits current from the primary circuit to the secondary circuit with small distortions. Therefore, having defined restrictions in the current rate of rise an amplitude in the transformer primary circuit, one shall receive an adequate current pulse without essential distortions in the secondary circuit to thereby ensure a reduction of disturbances from pulse current flowing in the welding circuit.

The short high voltage pulse is emitted from first high voltage pulse power source 110 during 1 to 10 microseconds at a voltage of 0.5 to 15 kV and current of 1 to 10 A. The long high voltage pulse is emitted from second high voltage pulse power source 112 during 0.1 to 100 microseconds at voltage of up to 1 kV. The open circuit voltage of welding power source 106 is 60 to 100 V.

Welding arc ignition by high voltage discharge between welding electrode 102 and workpiece 104 in the device shown in FIG. 7 is performed likewise.

First, welding electrode 102 and workpiece 104 are connected with welding power source 106. Then, welding electrode 102 and workpiece 104 are simultaneously connected with high voltage pulse power sources 110 and 112. Power from DC-source 122 is delivered to energy-storage capacitor 124 via high resistance charging resistor 126 and the capacitor is therefore charged. Voltage is delivered to energy-storage capacitor 144 via charging resistor 156 for charging thyristor 152.

For arc ignition, first, synchronizer 108 actuates thyristor 152 and then, after charging capacitor 144, synchronizer 108 actuates thyristor 128 and the previously charged capacitor 124 which discharges through the primary winding of transformer 116. In this case, a voltage pulse occurs in the secondary winding of transformer 116, and after the discharge gap is broken down, current flows through the gap, the amplitude and rate of change of the current is defined by a discharge circuit which includes resistor 130 and inductivity 132. Simultaneously, thyristor 148 is actuated and capacitor 144 is connected with the discharge gap via resistor 150. The discharge current of capacitor 144 heats up and maintains the discharge burning when the discharge pulse of capacitor 124 is over. As soon as the voltage in the current conducting duct has reduced to a value less than the open circuit voltage of welding power source 106 (e.g., 60 to 100 V), current starts flowing from source 106 to electrode 102 and workpiece 104 and the arc ignites.

A short high voltage pulse is emitted from first thyristor pulse generator 120 during 1 to 10 microseconds at a voltage of 0.5 to 15 kV and a current of 1 to 10 A. The long high voltage pulse from second thyristor pulse generator 140 has an open circuit voltage of up to 1 kV and duration from 0.1 to 100 microseconds.

The long high voltage pulse of second high voltage pulse power source 112 is delivered to the conducting duct simultaneously with the short pulse of first high voltage pulse power source 110 or even slightly earlier, so that the high voltage long pulse may pick up the discharge initiated by the short high voltage pulse. This pulse heats up the discharge conducting duct and creates conductivity sufficient to ignite a discharge from welding power source 106 having a low open circuit voltage.

The operation of thyristor pulse generators 120 and 140 with energy-storage capacitors, 124 and 144, respectively, differs in that capacitor 124 in generator 120 is charged from source 122 via thyristor 125, high resistor 126 and discharges via thyristor 128, resistor 130, which serves for limiting the discharge current, and inductor 132, whereas, in the generator 140, capacitor 144 is charged via charging thyristor 152 and high resistance charging resistor 156, and is discharged via a discharge thyristor 148 and discharge current limiting resistor 150. Resistors 130 and 150 serve in this case to provide an a periodic mode and eliminate oscillations of the high voltage discharge.

The operation of high voltage pulse power source 112 which includes at least two thyristor pulse generators 160 (FIG. 8) is performed likewise. Control device 168 defines the order of actuating generators 160 and so maintains the specified current level substantially during the entire specified pulse duration of second high voltage power source 112.

The operation of the pulse generators based on transistors 200 (FIGS. 9a–b) is as follows.

When there is no control, currents from device 240, transistors 200, 230 and 250 are off. When control device 240 is switched on, current from the latter flows through transistor 250, is amplified and delivered to the bases of transistors 200 and 230. The current ratio of transistors 200 and 230 is defined both by the ratio of transistor current densities according to the known Ebersa-Molla equation and by additional shift on base 212 of transistor 200, which is defined by resistor's 210 emitter circuit of transistor 230 (voltage reduction of 60 millivolts increases the current of transistor 200 tenfold). Hence, using resistor 210 it is possible to change the current transfer rate from the control circuit of control device 240 to the collector circuit of transistor 200 in a wide range.

Figure 11:
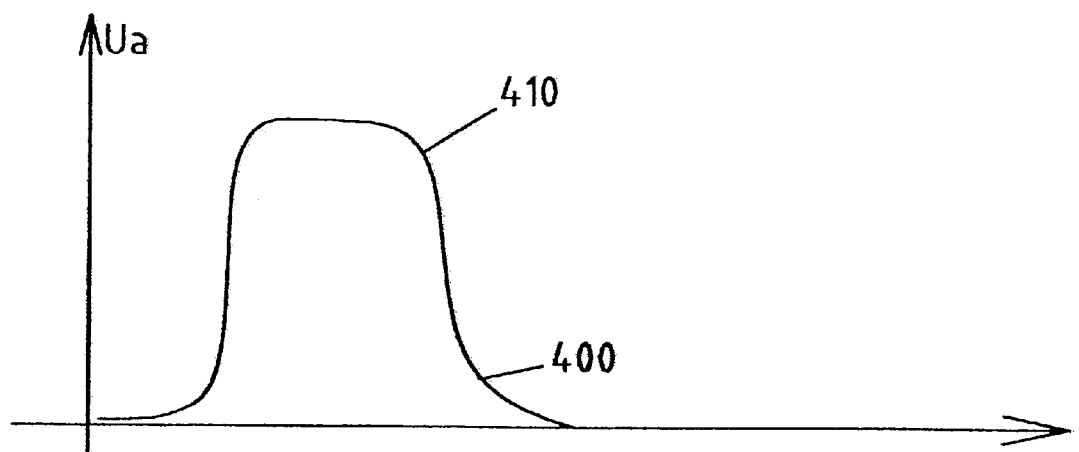
FIGS. 11–13 show typical forms of current pulses using welding arc ignition according to the method of the present invention.
Figure 12:
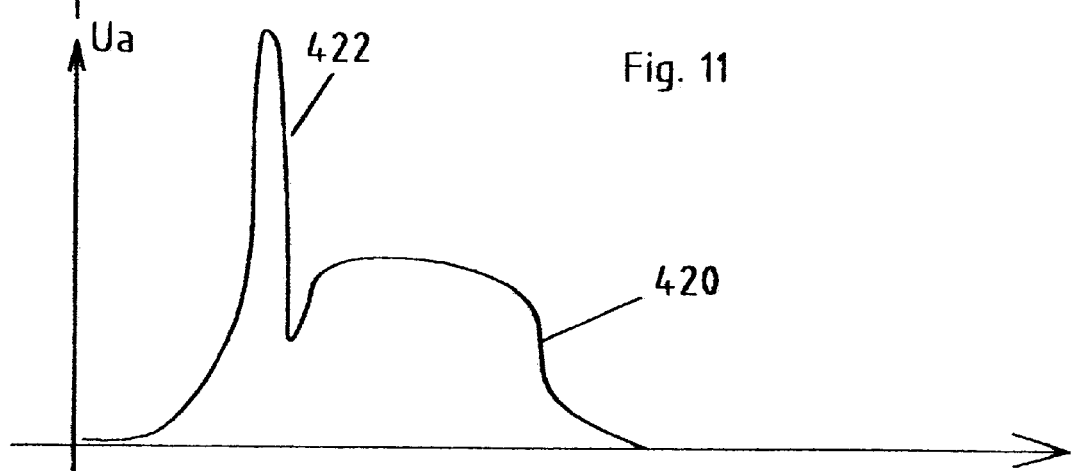

As shown in FIG. 11, the application of transistor 200 permits to create smoothed high voltage pulses 400 featuring a flat apex 410, as distinguished from thyristor pulse generators 120 and 140 the pulses 420 thereof have, as shown in FIG. 12, acute angle peaks 422.

Figure 13:
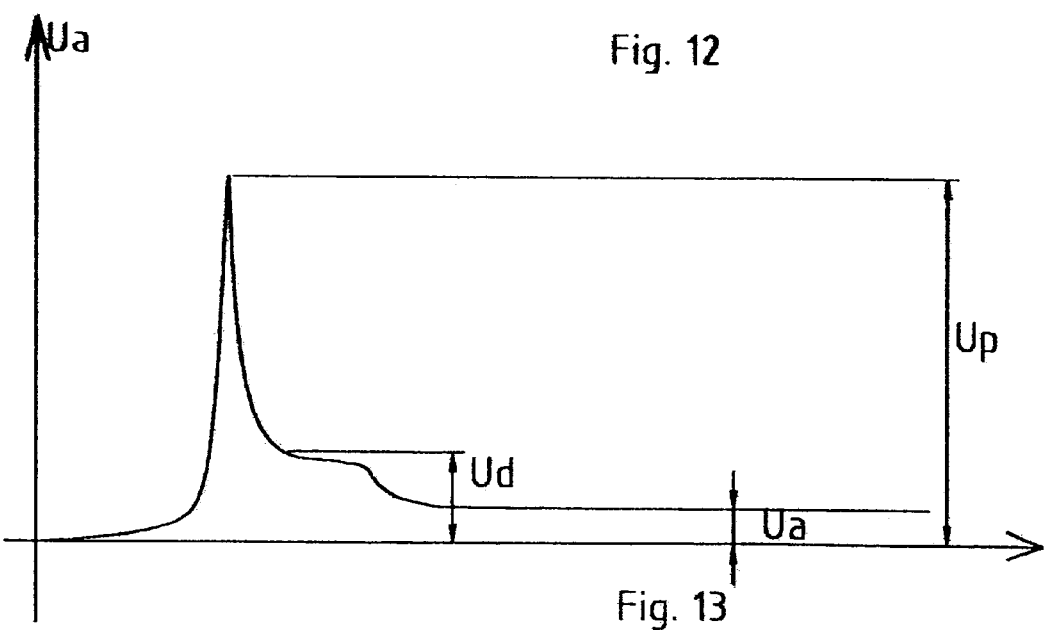

In general, the pulse of the welding arc ignition shown in FIG. 13 includes stages of breakdown voltage peak (Up), charge voltage (Ud) and voltage of an arc ignition and stabilization (Ua).

The operation of the device for welding arc ignition and stabilization for an arc welding AC apparatus is performed likewise.

The application of the method and device according to the present invention offers an advantage because a single high voltage pulse is emitted, and the current in the discharge circuit is limited, since the ratio of current rate of rise di/dt (current time gradient) is reduced. In addition, the long pulse has a limited current rate of rise (by 2 to 10 fold lower than the short pulse) and practically creates no disturbances. However its energy is sufficient to heat up the conducting duct to a level on which the welding arc can burn directly from the welding power source.

The novel method and device disclosed herein are based on the concept of reduction of the time gradient of the ignition current, due to the successive decreasing of the arc ignition current amplitude and increasing of the arc ignition pulse duration. Initiation and arc propagation is performed in two stages. During the first stage, the intermediate gas discharge develops due to the application of the high voltage and low power single pulse. Then, the above intermediate discharge is transferred to arc discharge by applying the low voltage relatively long aperiodical current pulse. As a result, the arc current time-gradient decreased. Therefore, the level of electromagnetic radiation (interference) dramatically decreased also.

All existing power supplies perform ignition and main arc discharge establishment via the use of high frequency oscillating electrical fields, which results in unacceptable electromagnetic interference level. The conventional power supplies frequently cannot be readily integrated in modern complicated automated systems, which employ intelligent controllers (robots, lasers, PC based control systems, etc.). To be integrated, such power supplies require special, complicated and expensive protective methods, such as filters, suppressors, screening, etc. However, these methods do not guarantee the required reliability and consistency of the weld.

Especially difficult problems are experienced while using standard power supply when welding aluminum alloys in AC mode and ignition of arc current during the entire welding process. In addition, the high level of electromagnetic radiation increases the risk of developing health problems.

The method and device according to the present invention solves all of the above listed problems associated with the prior art, due to a dramatically lower level of electromagnetic interference, resulting in simple and reliable power supply for different welding applications.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of igniting a welding arc of an arc welding apparatus by a high voltage discharge between a welding electrode and a workpiece, the method comprising the steps of:
   (a) connecting the welding electrode and the workpiece with a welding power source;
   (b) simultaneously connecting the welding electrode and the workpiece with at least a first and a second high voltage power sources;
   (c) applying a short a periodic high voltage pulse from said first high voltage power sources to an air gap being between the welding electrode and the workpiece, for breaking down, by electric discharge, said air gap, for creating an electroconductive duct therethrough, an output current of said first high voltage power source is restricted in amplitude and rate of rise;
   (d) superimposing said short a periodic high voltage pulse by another, long, high voltage pulse from said second high voltage power source, said long, high voltage pulse having a current rate of rise smaller than that of said short a periodic high voltage pulse, for generating a stretched pulse, thereby increasing a duration of said discharge current, heating said current conducting duct, reducing its electric resistance and igniting an arc thereat; and
   (e) reducing a voltage value in said current conducting duct to a value less than that of an open circuit voltage value of said welding power source, thereby effecting a current flow from said welding power source via said welding electrode and said arc to the workpiece and developing a welding arc burning from said welding power source.

2. A method according to claim 1, wherein said short a periodic high voltage pulse is applied from said first high voltage power source during 1 to 10 microseconds at a voltage of 0.5 to 15 kV and a current of 1 to 10 A.

3. A method according to claim 1, wherein said long high voltage pulse is applied from said second high voltage power source during 0.1 to 100 microsecond at a voltage of up to 1 kV.

4. A method according to claim 1, wherein said open circuit voltage value of said welding power source is between 60 and 100 V.

5. A method according to claim 1, wherein said first high voltage power source is a pulse current generator connected with a primary winding of a current transformer, and a secondary winding of said transformer is connected in series with a circuit of said welding power source.

6. A method according to claim 5, wherein currents flowing along said primary and said secondary windings of said current transformer exhibit:

$$\left| \frac{I_{1(t)} - K \cdot I_{2(t-t_0)}}{I_{1(m)}} \right| < 10\%$$

wherein $I_{1(t)}$ and $I_{2(t-t0)}$ are instantaneous current values in said primary and secondary transformer windings, respectively; K is a transformation ratio of said transformer; $I_{1(m)}$ is a maximum current value in said transformer's primary winding; t is a current time; and $t_0$ is a time lag of current pulse in said secondary winding in relation to a current pulse in said primary winding.

7. A method according to claim 1, wherein said second high voltage power source is a pulse current generator, connected in parallel with a circuit of said welding power source.

8. A welding arc ignition device for an arc DC-welding apparatus by a high voltage discharge between a welding electrode and a workpiece, the device comprising a first high voltage pulse power source for generating a short, high voltage pulse and a second high voltage power source for generating a long, high voltage pulse, an outlet of said first high voltage pulse power source being connected with a primary winding of a transformer, whereas said transformer's secondary winding is connected in series with a circuit of a welding power source, said second high voltage power source, being connected in parallel with said circuit of said welding power source, said first high voltage pulse power source being provided with an operation synchronizer, an inlet thereof being connected with an outlet of said second high voltage pulse power source.

9. A welding arc ignition device according to claim 8, wherein the welding arc ignition device is designed as an integral part of an arc welding apparatus and further comprising a control device being connected with outlets of said welding power source of the arc welding apparatus and being designed to switch on said second high voltage pulse power source every time when said welding power source is switched on.

10. A device according to claim 9, wherein said second high voltage pulse power source is a voltage—controlled current source provided with a control circuit, an open circuit voltage value of said controlled current source is at least 100 V, and an outlet of said controlled current source is connected in parallel with an outlet of said welding power source and said control circuit is connected with said control device.

11. A device according to claim 10, wherein said voltage-controlled current source is based on a transistor generating smoothed high voltage pulses, an emitter of said transistor is connected, via a resistor, to a respective outlet of a DC power source, a collector of said transistor is connected to an outlet of a pulse generator, and a base of said transistor is connected to said control device, the voltage thereof specifies a current of a certain form at the pulse generator outlet, and in this case:

$$I = \frac{U_c - U_{BE}}{R}$$

where I is a current of said pulse generator outlet; $U_c$ is a voltage of said control device; $U_{BE}$ is a voltage between said base of said transistor and said emitter of said transistor; and R is a resistance of said resistor.

12. A device according to claim 9, wherein said second high voltage pulse power source is a current-controlled current source provided with a control circuit, an open circuit voltage value of said controlled current source is at least 100 V, and an outlet of said controlled current source is connected in parallel with an outlet of said welding power source and said control circuit is connected with said control device.

13. A welding arc ignition device according to claim 8, wherein the welding arc ignition device is designed as a separate unit attached to the arc welding apparatus and is electrically connected with an outlet of said welding power source via a diode, which is connected in series with a circuit of said welding power source in current direction, the device further comprising a remote control device.

14. A device according to claim 13, wherein said remote control device is located close to the welding electrode.

15. A device according to claim 13, wherein said remote control device is located on said welding power source.

16. A device according to claim 8, wherein said first high voltage power source includes a thyristor pulse generator with a DC-power source and an energy-storage capacitor and has a discharge circuit with a current limiting element connected with an outlet of said pulse generator between said outlet of said pulse generator and said energy storage capacitor.

17. A device according to claim 16, wherein said thyristor pulse generator includes a charging thyristor, a high resistance charging resistor, an energy-storage capacitor, a discharge thyristor and a current limiting element—discharge resistor.

18. A device according to claim 17, wherein said thyristor pulse generator includes an energy-storage capacitor with a capacity of up to 1 microfarad, and said discharge circuit includes a discharge resistor and an inductor connected in series, the discharge circuit elements exhibiting:

$$R_0 \geq \sqrt{\frac{L_0}{C_0}}$$

where $R_0$ is a resistance of said discharge circuit; $L_0$ is an inductivity of said inductor; and $C_0$ is a capacity of said energy-storage capacitor.

19. A device according to claim 8, wherein said second high voltage pulse power source includes at least one thyristor pulse generator with an energy-storage capacitor which is connected with the welding electrode and the workpiece via a resistor limiting a discharge current.

20. A device according to claim 8, wherein said second high voltage pulse power source includes at least two thyristor pulse generators, outlets thereof are connected in parallel, and said generators are provided with a control device to switch them on in an order defined by said control device.

21. A welding arc ignition and stabilization device for an arc AC-welding apparatus by a high voltage discharge between a welding electrode and a workpiece, the device comprising a first high voltage pulse power source for generating short high voltage pulses, an outlet of said power source being connected with a primary winding of a transformer, and a secondary winding of said transformer is connected in series with a circuit of a welding power source, and a second high voltage power source connected in parallel with said circuit of said welding power source and being designed for generating long high voltage pulses, and an operation synchronizer, an inlet of said synchronizer being connected with an outlet of said second high voltage pulse power source.

22. A welding arc ignition device according to claim 21, wherein said welding arc ignition device is designed as an integral part of the arc AC-welding apparatus and further comprising a control device being connected with outlets of said welding power source and being designed to switch on said second high voltage pulse power source every time when said welding power source is switched on.

23. A device according to claim 22, wherein said second high voltage pulse power source further includes two antiparallel voltage-controlled current sources, each of which is provided with a control circuit, an open circuit voltage value of each of said two antiparallel voltage-controlled current sources is at least 100 V, outlets of said voltage-controlled current sources are connected in parallel with an outlet of said welding power source, and outlets of said control circuit are connected with said synchronizer.

24. A device according to claim 22, wherein said second high voltage pulse power r source includes two antiparallel current-controlled current sources, each of which is provided with a control circuit, an open circuit voltage value of each of said two antiparallel current-controlled current sources is at least 100 V, outlets of said current-controlled current sources are connected in parallel with an outlet of said welding power source, and outlets of said control circuit are connected with said synchronizer.

25. A welding arc ignition device according to claim 21, wherein said welding arc ignition device is designed as a separate unit attached to the arc welding apparatus and is electrically connected with outlets of said welding power source via a diode, said diode is connected in series with said circuit of said welding power source in current direction, the device further comprising a remote control device.

26. A device according to claim 25, wherein said remote control device is located close to said welding electrode.

27. A device according to claim 25, wherein said remote control device is located on the welding power source.

28. A device according to claim 21, wherein said first high voltage pulse power source includes two thyristor pulse generators with DC-power sources and energy-storage capacitors, each of said two thyristor pulse generators has a charging circuit including an energy-storage capacitor and a charging thyristor, said two thyristor pulse generators are connected, via a current limiting element, common for both said generators, to one pole of a respective DC-power source, each of said two thyristor pulse generators further has a discharge circuit including a discharge thyristor and a current limiting element, said discharge circuits of said pulse generators are connected with opposite outlets of said primary winding, whereas said winding midpoint is connected with the other pole of said DC-power source.

29. A device according to claim 28, wherein said current limiting element is a current limiting element—discharge resistor.

30. A device according to claim 29, wherein each of said energy-storage capacitors has a capacity up to 1 microfarad, and said discharge circuit includes a discharge resistor and an inductor connected in series and exhibiting:

$$R_0 \geq \sqrt{\frac{L_0}{C_0}}$$

where $R_0$ is a resistance of said discharge circuit; $L_0$ is an inductivity of said inductor; and $C_0$ is a capacity of said energy-storage capacitor.

31. A device according to claim 21, wherein said second high voltage pulse power source includes at least two thyristor pulse generators with energy-storage capacitors, each of which is connected by one of its outlets directly with the workpiece and through the other outlet thereof, via a resistor of discharge current limiting and a discharge thyristor with the welding electrode, one of said energy-storage capacitors is connected, via a charging thyristor and a current limiting element, with a positive pole of a respective DC-power source, and the other energy-storage capacitor is connected, via a charging thyristor and a current limiting element, to a negative pole of a respective DC-power source, the opposite poles of said DC-power sources are connected with each other and with the workpiece.

* * * * *